United States Patent [19]

Heffron

[11] 4,075,661
[45] Feb. 21, 1978

[54] AUTOMATIC PEAKING CIRCUIT

[75] Inventor: Charles Buckner Heffron, Fort Wayne, Ind.

[73] Assignee: The Magnavox Company, Fort Wayne, Ind.

[21] Appl. No.: 715,768

[22] Filed: Aug. 19, 1976

[51] Int. Cl.² .............................................. H04N 5/14
[52] U.S. Cl. ...................................... 358/166; 358/37
[58] Field of Search ................... 358/160, 166, 37, 38, 358/27

[56] References Cited

U.S. PATENT DOCUMENTS

| 3,535,443 | 10/1970 | Rieke | 358/166 X |
| 3,604,844 | 9/1971 | Ross | 358/27 X |
| 3,898,379 | 8/1975 | Howe et al. | 358/166 X |

Primary Examiner—Robert L. Griffin
Assistant Examiner—Aristotelis M. Psitos
Attorney, Agent, or Firm—George R. Pettit

[57] ABSTRACT

An apparatus is described for automatically restoring the loss of high frequency components in the luminance signal of a television receiver. The luminance signal is continuously sampled and a signal representing the high frequency content in the luminance signal is used to alter the frequency characteristics of the luminance signal path so as to maintain the frequency spectrum of the luminance signal substantially constant. Additionally, the frequency alteration of the luminance signal path is made responsive to the dynamic level of the video signal to provide increased peaking in the gray picture areas relative to the higher level whites. The system also functions to reduce the upper video spectrum noise level.

9 Claims, 5 Drawing Figures

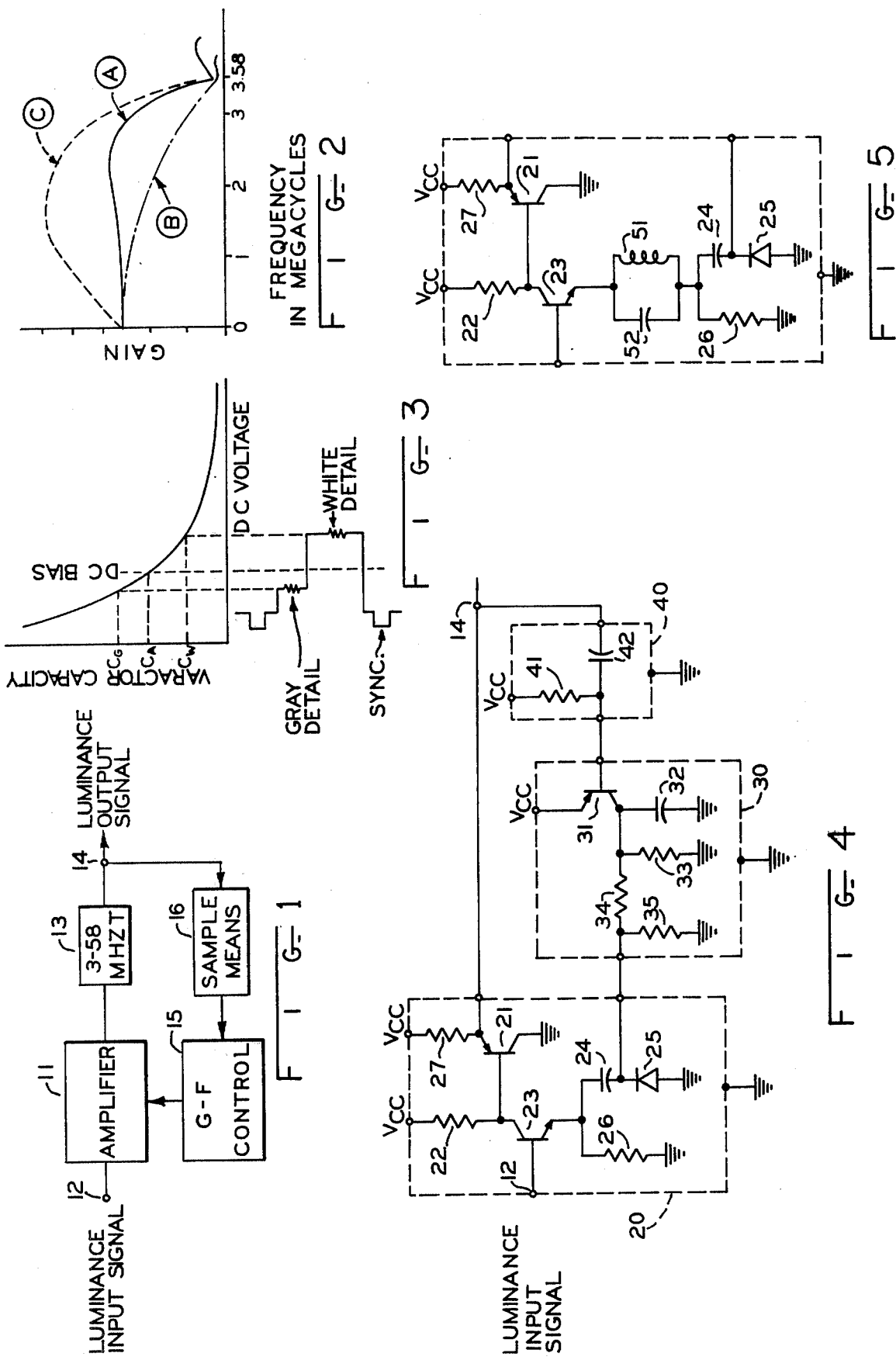

AUTOMATIC PEAKING CIRCUIT

BACKGROUND OF THE INVENTION

This invention relates to an apparatus for improving the viewing quality of a television receiver picture. Specifically this invention relates to altering the high frequency content in a television receiver luminance signal in accordance to its content, to provide consistently higher quality pictures.

It is known in the art that picture resolution in a television receiver may be improved by frequency compensating (known also as "peaking") the luminance signal path. The luminance signal suffers from a loss of high frequency content as a result of limited transmission bandwidth and limited receiver bandwidth which reduce picture resolution. Prior art techniques for increasing the effective bandwidth of received video signals include the use of a peaking amplifier in the luminance signal path. The peaking amplifier provides a means for varying the slope of the gain versus frequency characteristics of the luminance signal path. By varying the gain-frequency characteristics of the luminance signal path, the higher frequencies may be amplified or "peaked" to a greater extent than the lower frequencies. This increases the amplitude of the high frequency components in the luminance signal, resulting in improved picture resolution.

Excessive frequency compensation may also deteriorate picture resolution. When different channels are selected or different cameras are used at the television studio, the signal peaking requirements change. Consequently, the operator must frequently adjust the peaking control to establish the right amount of high frequency video content in the luminance signal to avoid either excessive or inadequate signal peaking Optimum peaking for a given scene depends upon the amount of detail in the picture, and the amount of high frequency noise in the luminance signal. Also, it is desirable to peak the higher level white areas of a picture to a lesser extend than the gray areas of the picture.

When viewing a good quality television picture having adequate detail and low noise content, it may be desirable to adjust the receiver luminance signal frequency response to "flat", or to adjust its response to provide a small amount of peaking of the higher frequencies containing the detail information to add "crispening" for a more pleasing picture.

When a "soft" picture signal is received which has little detail, it has been observed that a higher level of peaking at a lower frequency will crispen the picture without substantially increasing the visibility of high frequency noise.

Pictures which have objectionable levels of upper video spectrum noise are usually improved by decreasing the amount of peaking in the luminance channel which reduces the visibility of noise in the picture.

Conventional peaking systems apply equal amounts of peaking to the white and gray areas of the picture. While it may be desirable to provide a certain level of peaking to the gray area of a picture to improve its detail, the higher level whites, such as white alpha numerics or white small area details are also similarly peaked. This causes an excessive picture tube current resulting in defocussing and loss of picture detail in these high-light areas. It is desirable that a dynamic form of peaking be used to provide the gray level crispening without the high light defocussing.

SUMMARY OF THE INVENTION

It is an object of this invention to maintain the high frequency content of a luminance signal in a television receiver substantially constant.

It is another object of this invention to provide an adaptive peaking system which automatically adjusts the frequency response of the luminance signal path in response to the frequency content of the received video signal.

It is another object of this invention to apply higher frequency, lower level peaking to high quality picture signals, and to apply a higher level lower frequency peaking to soft, low detail picture signals.

It is another object of this invention to automatically reduce the level of peaking of the picture signal when objectionable noise levels are present.

It is another object of this invention to provide dynamic peaking of the video signal such that the portion of the video signal for white picture elements is peaked less than the gray picture area.

The invention described herein operates to automatically modify the frequency response of the luminance signal path to compensate for variations in the received signal so as to improve the consistency and quality of the reproduced picture. The invention further provides dynamic video peaking for picture crispening without high light defocussing, and reduced the visibility of noise in the picture when objectionable noise levels are present in the video signal.

A video amplifier having a controllable frequency response is placed in the luminance signal path of a television receiver. The output of the amplifier is continuously sampled and a signal for controlling the amplifier gain-frequency response is generated.

The video amplifier selected for use in the preferred embodiment is a common emitter transistor voltage amplifier. Control over the amplifier frequency response is achieved by terminating the emitter cicuit of the amplifier with a voltage variable impedance.

The voltage variable impedance of the present invention also provides dynamic peaking to the luminance signal whereby picture detail in the gray level is peaked more than picture detail in the white levels.

The voltage variable impedance of the transistor amplifier is operatively connected to a variable d.c. signal source indicative of the high frequency content of the luminance signal to be controlled. This d.c. signal is derived by first high pass filtering the luminance signal. The output of the high pass filter is in turn connected to a video signal detector circuit which produces a varying d.c. voltage proportional to the magnitude of its input signal. Because the detector input is taken from the output of the high pass filter, the d.c. signal produced by the detector will be a function of the high frequency content of the luminance signal.

The invention may be better understood by referring to the description of the preferred embodiment and the accompanying drawings.

DESCRIPTION OF THE DRAWINGS

FIG. 1 is a block diagram illustrating the automatic frequency control circuit of the present invention.

FIG. 2 is an illustrative of the gain-frequency response of the apparatus described by FIG. 1 for different luminance signals.

FIG. 3 illustrates the peaking effect of the apparatus described in FIG. 4 on a luminance signal.

FIG. 4 is a schematic diagram illustrating in detail a preferred embodiment of the circuit of the current invention.

FIG. 5 is an illustration of the amplifier shown in FIG. 4 which includes a filter trap for removing color information.

DESCRIPTION OF THE PREFERRED EMBODIMENT

Referring to FIG. 1, a block diagram illustrates a frequency compensation network for automatically peaking the luminance signal in a television receiver. The composite video signal containing the luminance signal enters terminal 12 of video amplifier 11. Amplifier 11 has a controllable gain-frequency response which is used to alter the high frequency content of the luminance signal. The response of amplifier 11 is automatically controlled in accordance with the high frequency content of the luminance signal appearing at terminal 14. A sample means 16 supplies a signal indicative of the high frequency content of the luminance signal at terminal 14. The signal produced by the sample means is applied to a control means 15 for varying the gain-frequency response of amplifier 11. A 3.58 MHz filter trap 13 is shown in series with amplifier 11. As is well known by persons skilled in the art, this 3.58 MHz filter trap 13 removes the color or chroma signal which occurs near a frequency of 3.58 MHz. Alternate means for suppressing color information in the luminance signal are well known to those skilled in the art.

As previously mentioned, the frequency response of amplifier 11 is determined by the high frequency content of the signal at terminal 14. The high frequency portion of the luminance signal spectrum contains thermal noise which will effect the frequency response of amplifier 11 by reducing the high frequency gain of amplifier 11. Referring to FIG. 2, curve B illustrates the frequency response of amplifier 11 when a large amount of thermal noise is present. The negative slope of curve B attenuates the noise in the high frequency region making the noise less visible in the picture.

The amount of high frequency content in a luminance signal is determined by the amount of detail in a given scene. The detail information in "soft" pictures is low level and at the lower video frequencies, and thus requires high level peaking at these lower frequencies to improve the picture quality. Curve C of FIG. 2 illustrates the gain frequency response for amplifier 11 when a soft picture is being received. The gain of the amplifier increases rapidly with frequency to enhance the picture detail present in the lower frequencies. The noise level of soft pictures is usually low, and this higher level peaking provides improved picture quality without excessive noise visibility.

Curve A represents the gain-frequency response of amplifier 11 when a luminance signal representing a good quality picture, having adequate high frequency detail and low noise content, is being received. The slope of Curve A increases positively to a high frequency to provide a small amount of high frequency peaking. This increased gain imparted to the higher frequency portion of the luminance signal enhances the high detail picture displayed by the television receiver.

The level of peaking of the present invention may also be made a function of picture brightness. Gray or dark areas of the recieved picture may be peaked to a greater extend than white or highlight areas of the picture. This nonlinearity of peaking between light and gray areas is desirable because of the nonlinearity of the picture tube brightness response. Increased peaking in white areas causes high picture tube beam currents to flow. The high currents cause a corresponding defocussing in white areas which deteriorates picture quality in these areas. The desirable nonlinear peaking characteristic, hereinafter referred to as dynamic peaking, is accomplished by the embodiment shown schematically in FIG. 4.

Referring now to FIG. 4, a schematic drawing of the apparatus illustrated in FIG. 1 is shown. The apparatus in FIG. 4 will provide the overall frequency response illustrated in FIG. 2 for the different peaking conditions defined by FIG. 2 as well as providing the aforementioned dynamic peaking. In order to clarify the description, the trap circuit of FIG. 1 has been omitted. Implementation of the 3.58 MHz trap will be discussed at a later point with reference to FIG. 5.

The amplifier of FIG. 1 is shown as circuit 20 in FIG. 4. The amplifier comprises a transistor 23 connected in the common emitter amplifier configuration. The collector of transistor 23 is connected to a supply of d.c. voltage Vcc through resistor 22. The emitter of transistor 23 is connected to a variable impedance device 25 through capacitor 24 and to a d.c. return path shown as resistor 26. The variable impedance device is a voltage-variable capacitor or varactor 25. The capacitance of varactor 25 changes in response to the d.c. voltage applied to it. Capacitor 24 provides d.c. blocking between varactor 25 and the emitter of transistor 23. The collector of transistor 23 produces a signal the magnitude of which is proportional to the ratio of collector impedance to emitter impedance. As the ratio increases, the magnitude of the signal appearing at the collector of transistor 23 increases. Thus, the gain of amplifier 20 may be controlled by altering the value of the impedance terminating the emitter of transistor 23.

Considering only the emitter circuit of transistor 23, the d.c. gain of amplfer 20 is determined by the resistance of resistor 26 and the a.c. gain is determined by the impedance of varactor 25. Since the impedance (capacitive reactance) of varactor 25 is a function of frequency, the gain of amplifier 20 will be a function of frequency. Thus, for a given value of capacitance of varactor 25, more gain will be imparted to higher frequency components than to lower frequency components. That is, the higher the frequency (below 4.5 MHz) the greater the gain. The gain of amplifier 20 at a given frequency is a function of the capacitance of varactor 25. Thus, as will be understood by persons skilled in the art, the slope of the gain-frequency response of amplifier 20 is a function of the capacitance of varactor 25. Since the capacitance of varactor 25 is determined by the d.c. voltage applied thereto, the gain-frequency response of amplifier 20 may be controlled by varying the d.c. voltage applied to varactor 25.

Amplifier 20 includes a second transistor 21 connected as an emitter follower amplifier to provide impedance matching between the high impedance collector circuit of transistor 23 and lower impedance circuits downstream. As shown in FIG. 4, the base of transistor 21 is connected to the collector of transistor 23, the collector of transistor 21 is connected to the common terminal, and the emitter of transistor 21 is connected to a positive source of d.c. voltage Vcc through resistor 27. The output of amplifier 20 is taken at the emitter of transistor 21.

A high pass filter circuit 40 consisting of a capacitor 42 and resistor 41 is used to sample the luminance signal continuously. The output of this high pass filter contains the high frequency components of the luminance signal. A video detector circuit 30 converts the high pass filter output signal to a d.c. voltage for controlling the frequency response of amplifier 20 as described above. The video detector circuit 30 comprises a transistor 31 having its emitter connected to a supply of d.c. voltage Vcc, and its collector connected to the common terminal through the parallel combination of a capacitor 32 and resistor 33. Transistor 31 acts as a video detector producing at the collector a d.c. voltage proportional to the a.c. signal applied to the base. A voltage divider circuit consisting of resistors 34 and 35 divides the d.c. voltage at the collector of transistor 31 to establish the proper operating point for varactor 25. This d.c. voltage is coupled from the common junction of resistors 34 and 35 to the voltage variable capacitor of amplifier 20. In this manner, as the high frequency content of the luminance signal supplied by amplifier 20 decreases, the output of high pass filter 40 decreases, and the control signal supplied by detector 30 decreases. The decrease in voltage supplied by detector 30 increases the capacitance of varactor 25. The increase in capacitance of varactor 25 causes the slope of the gain-frequency response of amplifier 20 to increase positively. This increase in slope of the gain frequency response of amplifier 20 causes high frequency signals appearing at the input of amplifier 20 to receive greater signal amplification than lower frequency signals.

As the high frequency content of the incoming luminance signal increases, the d.c. voltage supplied to varactor 25 will become more positive lowering the capacity of varactor 25. The lowering of the capacity will cause the gain-frequency characteristic to approach curve A. Further increases in high frequency signals due to noise will cause a lowering of the varactor capacity. The gain-frequency characteristic will then have a negative slope corresponding to curve B.

The dynamic peaking referred to earlier is accomplished by the circuit shown in FIG. 4. The varactor 25 has a capacity-voltage relationship which provides increased peaking in gray or dark picture areas and decreased peaking in light or high level white areas.

Referring now to FIG. 3, the varactor capacitance vs. voltage relationship is shown. Below the capacitor characteristic curve is a representation of the instantaneous level of a luminance signal which appears across the varactor 25. The left side of the instantaneous luminance signal represents black levels of picture detail, and the right side represents light or white picture detail. Between these two levels is a voltage representing gray details.

The d.c. bias voltage established on the varactor 25 is derived from the detector 30 and is proportional to the amount of high frequency content in the amplified luminance signal. This voltage establishes the average gain frequency response of the amplifier 11 for the luminance signal. The instantaneous gain imparted to the incoming luminance signal is dependent, however, on the combination of the detector 30 output voltage and the instantaneous luminance signal level. The gray luminance level shown produces a varactor capacity of Cg which is greater than the capacity CW produced by a white luminance signal level. This causes the gain of the amplifier 11 to be greater in the gray areas at a given frequency than in the white areas, thus providing increased gain to picture details in the gray area resulting in improved sharpness of details in the gray ares. The white level detail is peaked less because of the lower capacity CW exhibited by the voltage variable capacitor 25 when white level luminance signals are applied to the voltage capacitor 25. By lowering the magnitude of the gain, the white level detail does not cause the aforementioned problem of defocussing.

To implement the trap 13 of FIG. 1 in the circuit of FIG. 4, the amplifier 20 shown in FIG. 4 need only be slightly modified. Referring now to FIG. 5, the amplifier 20 of FIG. 4 is shown with the inclusion of a parallel tuned circuit consisting of inductor 51 and capacitor 52. The parallel tuned circuit is inserted in the emitter circuit of transistor 23 shown as in FIG. 5. Where the parallel resonant frequency of the parallel tuned circuit is selected to be 3.58 MHz, the amplifier output is substantially reduced for signals which occur at this frequency. Thus, by including in amplifier 20 of FIG. 4 the additional elements 51, 52 shown in FIG. 5, an effective filtering of color information from the luminance path may be accomplished.

Thus, there has been described an apparatus for altering the frequency response of the luminance signal path in response to the higher frequency content of the luminance signal, and further operates to alter the frequency response of the luminance signal path in response to the dynamic level of the video signal. Those skilled in the art will recognize other embodiments of the invention described more particularly by the claims that follow.

What is claimed is:

1. An automatic frequency compensation apparatus for maintaining a predetermined amount of high frequency content in a video signal comprising:
 a. a video amplifier having an input terminal for receiving said video signal and an output terminal, said amplifier having a selectable gain frequency response;
 b. means for sampling the high frequency content of a signal at said output terminal; and
 c. control means for changing the slope of the gain-frequency response of said amplifier, said control means being operatively connected to said means for sampling whereby a decrease in the amount of high frequency content at said amplifier output terminal will cause the slope of said amplifier gain-frequency response to increase positively.

2. The apparatus of claim 1 wherein said slope of said amplifier gain frequency response is less for signals representing white detail than signals representing gray detail.

3. An automatic frequency compensation apparatus for maintaining a predetermined amount of high frequency content in a video signal which comprises:
 a. an amplifier for supplying a video signal;
 b. a control means for varying the slope of the gain-frequency response of said amplifier, said control means being activated by a d.c. voltage;
 c. a high pass filter for filtering a video signal supplied by said amplifier; and
 d. a video signal detector for receiving a signal supplied by said high pass filter, said detector providing a d.c. voltage for activating said control means whereby the gain-frequency response of said amplifier is modified in response to the high-frequency signals at said amplifier output terminal.

4. An automatic peaking apparatus for enhancing television picture resolution which comprises:

a. a transistor amplifier having a base circuit for receiving a video signal containing said television receiver picture information, a collector circuit for supplying a video signal, and an emitter circuit;
b. a first capacitor;
c. A voltage variable capacitor connected in series with said first capacitor, said series combination being connected in parallel with said amplifier emitter circuit;
d. a video signal detector for providing a d.c. voltage to said variable capacitor; and
e. a high pass filter for providing a signal from said amplifier collector circuit to said video signal detector whereby said amplifier gain-frequency response is modified according to the amount of high frequency signals at the collector circuit of said amplifier.

5. The apparatus of claim 4 further comprising a means for removing a 3.58 MHz signal from said amplifier output signal.

6. The apparatus of claim 5 wherein the means for removing said 3.58 MHz signal comprises a parallel tuned circuit having a resonant frequency substantially at the color subcarrier frequency connected in series with said transistor amplifier emitter circuit.

7. The apparatus of claim 4 wherein said video signal detector comprises:
a. a transistor having an emitter terminal, a base terminal, and a collector terminal;
b. a capacitor having a first end connected to said collector terminal; and
c. means for supplying a voltage between said capacitor second end and said emitter terminal.

8. An automatic frequency compensation apparatus for enhancing television picture resolution comprising:
a. a source of video signals containing television picture information;
b. a transistor having base, emitter, and collector terminals, said base terminal being operatively connected to said source of video signals;
c. a voltage variable impedance having first and second terminals, said impedance first terminal being connected to said emitter terminal;
d. a load impedance having a first and second terminal, said first terminal being connected to said collector terminal;
e. a high pass filter for receiving a signal from said transistor collector terminal;
f. an a.c. signal detector for receiving an output signal from said high pass filter, said signal detector having a d.c. output voltage operably connected to said voltage variable impedance; and
g. means for supplying a d.c. voltage between said collector impedance second terminal and said voltage variable impedance second terminal.

9. The apparatus of claim 8 further comprising a second transistor having a base, an emitter, and collector; said second transistor base being connected to said first transistor collector, said second transistor collector being connected to said means for supplying a d.c. voltage, and said second transistor emitter terminal being connected to said high pass filter input terminal; and a resistor, said resistor being connected from said second transistor emitter to said means for supplying a d.c. voltage.

* * * * *